(12) United States Patent
Bhatnagar et al.

(10) Patent No.: US 10,081,159 B2
(45) Date of Patent: Sep. 25, 2018

(54) MATERIALS GRADIENT WITHIN ARMOR FOR BALANCING THE BALLISTIC PERFORMANCE

(71) Applicant: HONEYWELL INTERNATIONAL INC., Morristown, NJ (US)

(72) Inventors: Ashok Bhatnagar, Richmond, VA (US); Danelle Powers, Chesterfield, VA (US); Brian Waring, Chester, VA (US); Terry Chern, Colonial Heights, VA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 8 days.

(21) Appl. No.: 14/851,875

(22) Filed: Sep. 11, 2015

(65) Prior Publication Data
US 2016/0159034 A1 Jun. 9, 2016

Related U.S. Application Data

(60) Provisional application No. 62/088,015, filed on Dec. 5, 2014.

(51) Int. Cl.
| | | |
|---|---|---|
| *B32B 7/02* | (2006.01) | |
| *B32B 5/02* | (2006.01) | |
| *B32B 5/26* | (2006.01) | |
| *B32B 5/22* | (2006.01) | |
| *B32B 5/24* | (2006.01) | |
| *B32B 15/14* | (2006.01) | |
| *B32B 15/18* | (2006.01) | |
| *B32B 15/20* | (2006.01) | |
| *B32B 27/08* | (2006.01) | |
| *B32B 27/12* | (2006.01) | |
| *B32B 27/28* | (2006.01) | |
| *B32B 27/30* | (2006.01) | |
| *B32B 27/32* | (2006.01) | |
| *B32B 27/34* | (2006.01) | |
| *B32B 27/36* | (2006.01) | |
| *B32B 27/38* | (2006.01) | |

(52) U.S. Cl.
CPC ........... *B32B 7/02* (2013.01); *B32B 5/022* (2013.01); *B32B 5/024* (2013.01); *B32B 5/22* (2013.01); *B32B 5/245* (2013.01); *B32B 5/26* (2013.01); *B32B 15/14* (2013.01); *B32B 15/18* (2013.01); *B32B 15/20* (2013.01); *B32B 27/08* (2013.01); *B32B 27/12* (2013.01); *B32B 27/283* (2013.01); *B32B 27/304* (2013.01); *B32B 27/308* (2013.01); *B32B 27/32* (2013.01); *B32B 27/34* (2013.01); *B32B 27/36* (2013.01); *B32B 27/365* (2013.01); *B32B 27/38* (2013.01); *B32B 5/026* (2013.01); *B32B 2260/021* (2013.01); *B32B 2260/046* (2013.01); *B32B 2262/02* (2013.01); *B32B 2262/0223* (2013.01); *B32B 2262/0246* (2013.01); *B32B 2262/0253* (2013.01); *B32B 2262/0261* (2013.01); *B32B 2262/0269* (2013.01); *B32B 2262/0276* (2013.01); *B32B 2262/101* (2013.01); *B32B 2266/025* (2013.01); *B32B 2266/0235* (2013.01); *B32B 2266/0278* (2013.01); *B32B 2266/06* (2013.01); *B32B 2307/50* (2013.01); *B32B 2307/708* (2013.01); *B32B 2307/72* (2013.01); *B32B 2571/00* (2013.01); *B32B 2571/02* (2013.01)

(58) Field of Classification Search
CPC ........... B32B 7/02; B32B 5/22; B32B 27/283; B32B 27/12; B32B 15/14; B32B 15/18; B32B 15/20; B32B 27/08; B32B 27/304; B32B 5/245; B32B 27/38; B32B 27/365; B32B 27/36; B32B 27/34; B32B 27/32; B32B 27/308; B32B 5/022; B32B 5/024; B32B 2262/0246; B32B 2262/0223; B32B 2262/02; B32B 2260/046; B32B 2260/021; B32B 2571/02; B32B 2307/708; B32B 2307/50; B32B 2266/06; B32B 2266/0278; B32B 2266/025; B32B 2266/0235; B32B 2262/101; B32B 2262/0261; B32B 2307/72; B32B 2262/0276; B32B 2262/0269; B32B 2571/00; B32B 5/26; B32B 2262/0253
USPC ........................................................ 428/212
See application file for complete search history.

(56) References Cited

U.S. PATENT DOCUMENTS

| | | |
|---|---|---|
| 3,891,996 A | 7/1975 | Leach et al. |
| 4,287,607 A | 9/1981 | Leach |

(Continued)

FOREIGN PATENT DOCUMENTS

| | | |
|---|---|---|
| CZ | 302793 | 11/2011 |
| WO | 2005044559 | 5/2005 |

(Continued)

OTHER PUBLICATIONS

A.R. Othman, et al., "Effect of Different Construction Designs of Aramid Fabric on the Ballistic Performances," Materials & Design, vol. 44, Feb. 2013, pp. 407-413.

(Continued)

*Primary Examiner* — Brian Handville
(74) *Attorney, Agent, or Firm* — Roberts & Roberts, LLP; Richard S. Roberts, Jr.

(57) ABSTRACT

Hybrid, multi-panel ballistic resistant articles useful for the fabrication of body armor. The articles include at least three different fabric sections that are arranged into a gradient wherein the outermost, strike-face section of the article is formed from fibers having the highest tenacity of the article.

19 Claims, No Drawings

(56) References Cited

U.S. PATENT DOCUMENTS

| | | | |
|---|---|---|---|
| 4,737,402 A * | 4/1988 | Harpell | A42B 3/062 |
| | | | 428/902 |
| 5,926,842 A | 7/1999 | Price et al. | |
| 5,941,186 A | 8/1999 | Argentino | |
| 6,133,169 A | 10/2000 | Chiou et al. | |
| 6,147,018 A | 11/2000 | Chiou | |
| 6,684,404 B2 | 2/2004 | Bachner, Jr. et al. | |
| 6,841,791 B2 | 1/2005 | Demeo et al. | |
| 6,846,548 B2 | 1/2005 | Harpell et al. | |
| 7,642,206 B1 | 1/2010 | Bhatnagar et al. | |
| 7,665,149 B2 | 2/2010 | Carbajal et al. | |
| 7,919,418 B2 | 4/2011 | Bhatnagar et al. | |
| 8,015,617 B1 | 9/2011 | Carbajal et al. | |
| 8,017,529 B1 | 9/2011 | Arvidson et al. | |
| 8,613,242 B2 | 12/2013 | Peters | |
| 8,695,112 B2 | 4/2014 | Bhatnagar et al. | |
| 8,986,810 B2 | 3/2015 | Grunden et al. | |
| 2004/0092183 A1 | 5/2004 | Geva et al. | |
| 2005/0153098 A1 | 7/2005 | Bhatnagar et al. | |
| 2006/0048284 A1 * | 3/2006 | Kapah | A42B 3/06 |
| | | | 2/411 |
| 2007/0293109 A1 | 12/2007 | Bhatnagar et al. | |
| 2009/0130425 A1 | 5/2009 | Whitaker et al. | |
| 2009/0142557 A1 | 6/2009 | Hardin | |
| 2010/0275337 A1 | 11/2010 | Bhatnagar et al. | |
| 2012/0118135 A1 | 5/2012 | Warren | |
| 2012/0177869 A1 | 7/2012 | Micarelli | |
| 2012/0189804 A1 | 7/2012 | Chiou et al. | |
| 2012/0192339 A1 | 8/2012 | Bhatnagar et al. | |
| 2012/0216324 A1 | 8/2012 | Medwell | |
| 2012/0233733 A1 | 9/2012 | Fahnestock et al. | |
| 2013/0061739 A1 | 3/2013 | Cheong et al. | |
| 2013/0212763 A1 * | 8/2013 | Bhatnagar | A42B 3/063 |
| | | | 2/2.5 |
| 2013/0213208 A1 | 8/2013 | Compton et al. | |
| 2013/0224428 A1 | 8/2013 | Clerici et al. | |
| 2014/0230638 A1 | 8/2014 | Waldrop | |
| 2014/0260937 A1 | 9/2014 | Whitaker | |
| 2014/0290474 A1 | 10/2014 | Citterio et al. | |
| 2015/0033935 A1 | 2/2015 | Boyer et al. | |
| 2015/0135937 A1 | 5/2015 | Bader et al. | |

FOREIGN PATENT DOCUMENTS

| | | |
|---|---|---|
| WO | 2007005043 | 1/2007 |
| WO | 2011093868 | 8/2011 |
| WO | 2012150164 | 11/2012 |
| WO | 2015047513 | 4/2015 |

OTHER PUBLICATIONS

Guidry et al., Conference/Meeting abstract, "Composite armor: Multi-layered polymer protection," 241st ACS National Meeting & Exposition, Anaheim, CA, published by the American Chemical Society (Mar. 28, 2011).

Wang et al., "Effect of interlayer on stress wave propagation in CMC/RHA multi-layered structure," Composites Science and Technology, published by Elsevier Ltd., vol. 70, pp. 1669-1673 (2010).

Xiong et al., "Influence of ply stacking hybrid on penetration properties of composite laminates," Cailiao Kexue Yu Gongcheng Xuebao, published by Cailiao Kexue Yu Gongcheng Xuebao Bianjibu, vol. 21(2), pp. 178-182 (2003). English Abstract and English Tables/Figures Only Only.

Jacobs et al, "Ballistic protection mechanisms in personal armour," Journal of Materials Science, published by Kluwer Academic Publishers, vol. 36, pp. 3137-3142 (2001).

* cited by examiner

MATERIALS GRADIENT WITHIN ARMOR FOR BALANCING THE BALLISTIC PERFORMANCE

CROSS-REFERENCE TO RELATED APPLICATION

This application claims the benefit of U.S. Provisional Application Ser. No. 62/088,015, filed on Dec. 5, 2014, the disclosure of which is incorporated by reference herein in its entirety.

BACKGROUND

Technical Field

This technology relates to ballistic resistant composite articles having improved backface deformation resistance as well as superior ballistic penetration resistance. Particularly, this technology relates to hybrid, multi-panel ballistic resistant articles that are especially useful for the fabrication of body armor.

Description of the Related Art

Ballistic resistant articles such as bullet resistant vests, helmets, vehicle panels and structural members of military equipment are typically made from composite armor comprising high strength fibers. High strength fibers conventionally used to fabricate composite armor include polyethylene fibers, aramid fibers such as poly(phenylenediamine terephthalamide), graphite fibers, nylon fibers, glass fibers and the like. For some applications, the fibers are formed into woven or knitted fabrics. For other applications, the fibers are coated with a polymeric binder material and formed into non-woven fabrics.

Various ballistic resistant constructions are known that are useful for the formation of hard or soft body armor articles such as helmets and vests. For example, U.S. Pat. Nos. 4,403,012, 4,457,985, 4,613,535, 4,623,574, 4,650,710, 4,737,402, 4,748,064, 5,552,208, 5,587,230, 6,642,159, 6,841,492, 6,846,758, all of which are incorporated herein by reference, describe ballistic resistant composites which include high strength fibers made from materials such as extended chain ultra-high molecular weight polyethylene (UHMW PE). These composites display varying degrees of ballistic resistance to high speed projectiles such as bullets, shells, shrapnel and the like.

The two primary measures of anti-ballistic performance of composite armor are ballistic penetration resistance and blunt trauma ("trauma") resistance. A common characterization of ballistic penetration resistance is the $V_{50}$ velocity, which is the experimentally derived, statistically calculated impact velocity at which a projectile is expected to completely penetrate armor 50% of the time and be completely stopped by the armor 50% of the time. For composites of equal areal density (i.e. the weight of the composite armor divided by the surface area) the higher the $V_{50}$ the better the penetration resistance of the composite. In this regard, it is known that the $V_{50}$ ballistic performance of fibrous composite armor is directly related to the strength of the constituent fibers of the composite.

Whether or not a high speed projectile penetrates armor, when the projectile engages the armor the impact also deflects the body armor at the area of impact, potentially causing significant non-penetrating, blunt trauma injuries. The measure of the depth of deflection of body armor due to a bullet impact is known as backface signature ("BFS"), also known in the art as backface deformation or trauma signature. Potentially resulting blunt trauma injuries may be as deadly to an individual as if the bullet had fully penetrated the armor and entered the body. This is especially consequential in the context of helmet armor, where the transient protrusion caused by a stopped bullet can still cross the plane of the skull underneath the helmet and cause debilitating or fatal brain damage. Accordingly, there is a need in the art for ballistic resistant composites having both superior $V_{50}$ ballistic performance as well as low backface signature.

This disclosure provides a solution to this need. Particularly, it has been unexpectedly found that body armor having excellent ballistic penetration resistance performance and backface signature performance can be achieved at a lower cost by combining multiple different sections of materials. The sections are arranged into a gradient wherein the outermost, strike-face section of the article is formed from fibers having the highest tenacity of the article, and the outermost section on the opposite side of the article will be formed from the lowest tenacity fibers of the article or from no fibers at all. In this regard, each section of the composite article performs a different function. The first, outermost strike-face section of fibrous plies functions to break open the metal casing of a bullet, such as a 9 mm Full Metal Jacket (FMJ) bullet which comprises a lead core portion covered by a copper casing (jacket). Breaking open of the casing will thereby expose the lead core. The second section of fibrous plies will then deform any remaining portion of the casing material as well as the bullet core material and also reduce the velocity of the deformed parts and any projectile fragments. The third section will then distribute the remaining kinetic energy of the bullet over a large area and thus reduce the trauma energy transmitted to the user of the armor. Together, the different sections of material provide excellent ballistic penetration resistance and trauma resistance.

SUMMARY

Provided is a ballistic resistant composite comprising:

a first fibrous material comprising one or more first fibrous plies, each of the first fibrous plies comprising fibers that have a tenacity of greater than 27 g/denier;

a second fibrous material attached to the first fibrous material, said second fibrous material comprising one or more second fibrous plies, each of the second fibrous plies comprising fibers that have a tenacity lower than the tenacity of the fibers of the first fibrous material; and a third fibrous material attached to the second fibrous material, said third fibrous material comprising one or more third fibrous plies, each of the third fibrous plies comprising fibers that have a tenacity lower than the tenacity of the fibers of the second fibrous material;

wherein the first fibrous material, second fibrous material and third fibrous material are bonded together and form a consolidated, unitary composite article.

Further provided is a ballistic resistant composite comprising:

a first fibrous material comprising one or more first fibrous plies, each of the first fibrous plies comprising fibers;

a second fibrous material attached to the first fibrous material, said second fibrous material comprising one or more second fibrous plies, each of the second fibrous plies comprising fibers that have a tenacity lower than the tenacity of the fibers of the first fibrous material; and a non-fibrous sheet material attached to the second fibrous material;

wherein the first fibrous material, second fibrous material and third fibrous material are bonded together and form a consolidated, unitary composite article.

Also provided is a ballistic resistant composite comprising:

a first fibrous material comprising one or more first fibrous plies, each of the first fibrous plies comprising fibers, wherein each of said fibers has a tenacity of greater than 27 g/denier;

a second fibrous material attached to the first fibrous material, said second fibrous material comprising one or more second fibrous plies, each of the second fibrous plies comprising fibers, wherein each of said fibers has a tenacity of at least 50% less than the tenacity of the fibers of the first fibrous material; and a third fibrous material attached to the second fibrous material, said third fibrous material comprising one or more third fibrous plies, each of the third fibrous plies comprising fibers, wherein each of said fibers has a tenacity of at least 50% less than the tenacity of the fibers of the second fibrous material;

wherein the first fibrous material, second fibrous material and third fibrous material are bonded together and form a consolidated, unitary composite article.

DETAILED DESCRIPTION

The composites provided herein include three or more different sections, at least two of the sections comprising a plurality of fibrous plies. Each of the fibrous plies comprises a plurality of fibers and optionally a polymeric binder material on the fibers. A first fibrous material having first and second surfaces is positioned as the strike face section of the composite, i.e. the outermost section that a projectile threat will strike first. The projectile will first contact the first surface of the first fibrous material. A second fibrous material having first and second surfaces is attached to the second surface of the first fibrous material. A third section having first and second surfaces is attached to the second surface of the second fibrous material. The third section may be a fibrous material comprising fibers or may be a non-fibrous material, such as a non-fibrous sheet.

Most or all of the fibers forming the first fibrous material and the second fibrous material are high strength fibers, with the first fibrous material comprising stronger fibers, i.e. fibers having a higher tenacity, than the fibers forming the second fibrous material. As used herein, a "high strength fiber" fiber is one which has a minimum tenacity of at least 7 g/denier, a preferred tensile modulus of at least about 150 g/denier, and preferably an energy-to-break of at least about 8 J/g, each as measured by ASTM D2256. However, the fibers forming each of the first fibrous material and the second fibrous material are substantially greater than 7 g/denier, and most or all of the fibers forming the first fibrous material are substantially greater than the fibers forming the second fibrous material. By "most or all" it is meant that more than 50% of the fibers forming the first fibrous material have a tenacity that is greater than the tenacity of at least 50% of the fibers forming the second fibrous material. In more preferred embodiments, at least 75% of the fibers forming the first fibrous material have a tenacity that is greater than the tenacity of at least 75% of the fibers forming the second fibrous material. In still more preferred embodiments, at least 95% of the fibers forming the first fibrous material have a tenacity that is greater than the tenacity of at least 95% of the fibers forming the second fibrous material. Most preferably, all of the fibers of the first fibrous material are fibers having a tenacity greater than all of the fibers of the second fibrous material. In this regard, the fibers forming each of the first fibrous material and the second fibrous material are exclusive of fibers or threads employed to stitch or sew together any of the fibrous plies or sections. Accordingly, the first fibrous material by itself has significantly greater ballistic penetration resistance than the second fibrous material by itself.

When the third section comprises fibers, it is referred to herein as a third fibrous material. In accordance with the preferred embodiments, more than 50% of the fibers forming the second fibrous material have a tenacity that is greater than the tenacity of at least 50% of the fibers forming the third fibrous material. In more preferred embodiments, at least 75% of the fibers forming the second fibrous material have a tenacity that is greater than the tenacity of at least 75% of the fibers forming the third fibrous material. In still more preferred embodiments, at least 95% of the fibers forming the second fibrous material have a tenacity that is greater than the tenacity of at least 95% of the fibers forming the third fibrous material. Most preferably, all of the fibers of the second fibrous material are fibers having a tenacity greater than all of the fibers of the third fibrous material. Accordingly, the both the first fibrous material and the second fibrous material individually have significantly greater ballistic penetration resistance than the third fibrous material individually, and as stated above, the fibers forming each of the first fibrous material, second fibrous material and third fibrous material are exclusive of fibers or threads employed to stitch or sew together a plurality of fibrous plies or sections.

In accordance with this objective, each of the fibers of the second fibrous material preferably has a tenacity of at least 25% less than the tenacity of the fibers of the first fibrous material, and each of the fibers of the optional third fibrous material preferably has a tenacity of at least 25% less than the tenacity of the fibers of the second fibrous material. In further accordance with this objective, it is preferred that each of the fibers forming the fibrous plies of the first fibrous material (i.e. the first fibrous plies) are preferably fibers having a tenacity of greater than 27 g/denier, more preferably a tenacity of from about 28 g/denier to about 60 g/denier, still more preferably from about 33 g/denier to about 60 g/denier, still more preferably 39 g/denier or more, still more preferably from at least 39 g/denier to about 60 g/denier, still more preferably 40 g/denier or more, still more preferably 43 g/denier or more, or at least 43.5 g/denier, still more preferably from about 45 g/denier to about 60 g/denier, still more preferably at least 45 g/denier, at least about 48 g/denier, at least about 50 g/denier, at least about 55 g/denier or at least about 60 g/denier. Each of the fibers forming the fibrous plies of the second fibrous material (i.e. the second fibrous plies) are preferably fibers having a tenacity of from about 20 g/denier to about 45 g/denier, more preferably from about 20 g/denier to about 40 g/denier, still more preferably from about 20 g/denier to about 35 g/denier, and most preferably from about 20 g/denier to about 30 g/denier. However, the fibers of said second fiber plies may be higher depending on the tenacity of the fibers forming the first fibrous plies.

In embodiments where the third section is a third fibrous material, each of the fibers forming the fibrous plies of said third fibrous material (i.e. the third fibrous plies) are preferably fibers having a tenacity of from about 3 g/denier to about 34 g/denier (e.g. 33.75 g/d (25% of 45 g/d)), more preferably from about 5 g/denier to about 30 g/denier, still more preferably from about 5 g/denier to about 25 g/denier, still more preferably from about 5 g/denier to about 20 g/denier, still more preferably from about 5 g/denier to about 15 g/denier, and still more preferably from about 5 g/denier to about 10 g/denier. However, the fibers of said third fiber plies may be lower or higher. For example, in one embodiment, the third fibrous material comprises fibers having a tenacity of less than 7 g/denier, less than 6 g/denier or less than 5 g/denier.

In more preferred embodiments, each of the fibers of the second fibrous material preferably has a tenacity of at least 35% less than the tenacity of the fibers of the first fibrous material, and each of the fibers of the optional third fibrous material preferably has a tenacity of at least 35% less than the tenacity of the fibers of the second fibrous material. Still more preferably, each of the fibers of the second fibrous material preferably has a tenacity of at least 50% less than the tenacity of the fibers of the first fibrous material, and each of the fibers of the optional third fibrous material preferably has a tenacity of at least 50% less than the tenacity of the fibers of the second fibrous material. In these embodiments, the fiber types forming each fibrous material section may be the same as or different than the fiber types forming the other fibrous material sections. It is also within the scope of the invention that the fibers of the second fibrous material may be only 10% less or from about 10% to about 25% less, or from about 25% less to about 50% less than the tenacity of the fibers of the first fibrous material, and the fibers of the third fibrous material may be only 10% less or from about 10% to about 25% less, or from about 25% less to about 50% less than the tenacity of the fibers of the second fibrous material, but at least a 25% difference is most preferred.

Additionally, while it is preferred that "each" of the fibers in a particular fibrous material section has a different tenacity than "each" of the fibers in "each" adjacent fibrous material section, one or more of the fibrous material sections may include a small portion of fibers (e.g. less than 10%) having other tenacities that may be the same as one or more of the other sections, as long as most of the fibers (i.e. >50%, ≥60%, ≥70%, ≥80%, ≥90%; ≥95%; ≥98%; or ≥99%) in each consecutive fibrous material section, beginning at the first, strike face section, have tenacities that are at least 10% greater, more preferably at least 25% greater, than the previous fibrous material section. For example, the second fibrous material section may optionally include a small portion of fibers/filaments, preferably less than 10% of the total number of fibers/filaments in the section, that have the same tenacity or a greater tenacity than the fibers in the first fibrous material section, or that have the same tenacity or a lower tenacity than fibers a third fibrous section. This, however, is not preferred. Any overlap in the above specified tenacity ranges still require the that the other fiber tenacity requirements of the fibrous material sections be met, i.e. if the fibers of the first fibrous material section (i.e. >50%, ≥60%, ≥70%, ≥80%, ≥90%; ≥95%; ≥98%; or ≥99%, or 100% of the fibers) have a tenacity of 28 g/denier, the fibers of the first fibrous material section (i.e. >50%, ≥60%, ≥70%, ≥80%, ≥90%; ≥95%; ≥98%; or ≥99%, or 100% of the fibers) should have tenacities of at least 25% less than 28 g/denier, i.e. 21 g/denier or less. Most preferably all the fibers forming each respective individual (single) fibrous ply and individual (single) fibrous layer are identical to each other in polymer type, chemical composition and tenacity, and most preferably all the fibers forming a single fibrous material section are identical to each other in polymer type, chemical composition and tenacity. Accordingly, a fibrous material section is most clearly distinguished from other fibrous material sections by the differences in the component fibers forming each respective section, particularly the tenacity of the fibers in the different sections.

The fibers forming the fibrous plies of the each of the first fibrous material, second fibrous material and optional third fibrous material may vary depending on the desired tensile properties for each material. Particularly suitable high tenacity fibers include polyolefin fibers, such as high molecular weight polyethylene fibers, particularly ultra-high molecular weight polyethylene fibers, and polypropylene fibers. Also suitable are aramid fibers, particularly para-aramid fibers, polyamide fibers, polyethylene terephthalate fibers, polyethylene naphthalate fibers, extended chain polyvinyl alcohol fibers, extended chain polyacrylonitrile fibers, polybenzoxazole (PBO) fibers, polybenzothiazole (PBT) fibers, liquid crystal copolyester fibers, rigid rod fibers such as M5® fibers, and glass fibers, including electric grade fiberglass (E-glass; low alkali borosilicate glass with good electrical properties), structural grade fiberglass (S-glass; a high strength magnesia-alumina-silicate) and resistance grade fiberglass (R-glass; a high strength alumino silicate glass without magnesium oxide or calcium oxide). Each of these fiber types is conventionally known in the art. Also suitable for producing polymeric fibers are copolymers, block polymers and blends of the above materials.

The most preferred fiber types for the first fibrous material and second fibrous material are high performance fibers including polyethylene fibers (particularly extended chain polyethylene fibers), aramid fibers, PBO fibers, liquid crystal copolyester fibers, polypropylene fibers (particularly highly oriented extended chain polypropylene fibers), polyvinyl alcohol fibers, polyacrylonitrile fibers, glass fibers and rigid rod fibers, particularly M5® rigid rod fibers. Specifically most preferred are polyethylene fibers and aramid fibers. The fibers forming each of the first fibrous material and second fibrous material may be the same fiber type or may be different fiber types. When the fibers forming the first fibrous material and second fibrous material are the same fiber type (e.g. both comprise, consist of or consist essentially of polyethylene fibers, or both comprise, consist of or consist essentially of aramid fibers) the fibers of the second fibrous material must still have a lower tenacity than the fibers of the first fibrous material, preferably at least 25% less, more preferably at least 35% less, most preferably at least 50% less than the tenacity of the fibers of the first fibrous material.

In the case of polyethylene, preferred fibers are extended chain polyethylenes having molecular weights of at least 300,000, preferably at least one million and more preferably between two million and five million. Such extended chain polyethylene (ECPE) fibers may be grown in solution spinning processes such as described in U.S. Pat. No. 4,137,394 or 4,356,138, which are incorporated herein by reference, or may be spun from a solution to form a gel structure, such as described in U.S. Pat. Nos. 4,413,110; 4,536,536; 4,551,296; 4,663,101; 5,006,390; 5,032,338; 5,578,374; 5,736,244; 5,741,451; 5,958,582; 5,972,498; 6,448,359; 6,746,975; 6,969,553; 7,078,099; 7,344,668 and U.S. patent application publication 2007/0231572, all of which are incorporated herein by reference. Particularly preferred fiber types are any of the polyethylene fibers sold under the trademark SPECTRA® from Honeywell International Inc. SPECTRA® fibers are well known in the art. Other useful polyethylene fiber types also include and DYNEEMA® UHMW PE yarns commercially available from Royal DSM N.V. Corporation of Heerlen, The Netherlands.

Particularly preferred methods for forming UHMW PE fibers are processes that are capable of producing UHMW PE fibers having tenacities of at least 39 g/denier, most preferably where the fibers are multi-filament fibers. The most preferred processes include those described in commonly-owned U.S. Pat. Nos. 7,846,363; 8,361,366; 8,444,898; 8,747,715; as well as U.S. publication no. 2011-0269359, the disclosures of which are incorporated by reference herein to the extent consistent herewith. Such processes are called "gel spinning" processes, also referred to as "solution spinning," wherein a solution of ultra high molecular weight polyethylene and a solvent is formed, followed by extruding the solution through a multi-orifice spinneret to form solution filaments, cooling the solution filaments into gel filaments, and extracting the solvent to form dry filaments. These dry filaments are grouped into bundles which are referred to in the art as either fibers or yarns. The fibers/yarns are then stretched (drawn) up to a maximum drawing capacity to increase their tenacity.

Preferred aramid (aromatic polyamide) fibers are well known and commercially available, and are described, for example, in U.S. Pat. No. 3,671,542. For example, useful aramid filaments are produced commercially by DuPont under the trademark of KEVLAR®. Also useful herein are poly(m-phenylene isophthalamide) fibers produced commercially by DuPont of Wilmington, Del. under the trademark NOMEX® and fibers produced commercially by Teijin Aramid Gmbh of Germany under the trademark TWARON®; aramid fibers produced commercially by Kolon Industries, Inc. of Korea under the trademark HERACRON®; p-aramid fibers SVM™ and RUSAR™ which are produced commercially by Kamensk Volokno JSC of Russia and ARMOS™ p-aramid fibers produced commercially by JSC Chim Volokno of Russia.

Suitable PBO fibers are commercially available and are disclosed for example in U.S. Pat. Nos. 5,286,833, 5,296,185, 5,356,584, 5,534,205 and 6,040,050, each of which is incorporated herein by reference. Suitable liquid crystal copolyester fibers are commercially available and are disclosed, for example, in U.S. Pat. Nos. 3,975,487; 4,118,372 and 4,161,470, each of which is incorporated herein by reference, and including VECTRAN® liquid crystal copolyester fibers commercially available from Kuraray Co., Ltd. of Tokyo, Japan. Suitable polypropylene fibers include highly oriented extended chain polypropylene (ECPP) fibers as described in U.S. Pat. No. 4,413,110, which is incorporated herein by reference. Suitable polyvinyl alcohol (PV—OH) fibers are described, for example, in U.S. Pat. Nos. 4,440,711 and 4,599,267 which are incorporated herein by reference. Suitable polyacrylonitrile (PAN) fibers are disclosed, for example, in U.S. Pat. No. 4,535,027, which is incorporated herein by reference. Each of these fiber types is conventionally known and is widely commercially available. M5® fibers are formed from pyridobisimidazole-2,6-diyl(2,5-dihydroxy-p-phenylene) and were most recently manufactured by Magellan Systems International of Richmond, Va. and are described, for example, in U.S. Pat. Nos. 5,674,969, 5,939,553, 5,945,537, and 6,040,478, each of which is incorporated herein by reference. The term "rigid rod" fibers is not limited to such pyridobisimidazole-based fiber types, and many PBO and aramid fiber varieties are often referred to as rigid rod fibers. Commercially available glass fibers include S2-Glass® S-glass fibers commercially available from AGY of Aiken, S.C., HiPerTex™ E-Glass fibers, commercially available from 3B Fibreglass of Battice, Belgium, and VETROTEX® R-glass fibers from Saint-Gobain of Courbevoie, France.

The fibers forming a third fibrous material may or may not be formed from high performance fibers, but as noted previously the fibers of the third fibrous material will have tenacities lower than each of the first fibrous material and second fibrous material, preferably comprising fibers having tenacities at least 25% less than the fibers forming the second fibrous material. Suitable fibers for forming the third fibrous material non-exclusively include nylon fibers, polyester fibers, polypropylene fibers, polyolefin fibers or a combination thereof, preferably having tenacities from about 5 g/denier to about 20 g/denier, more preferably from about 5 g/denier to about 15 g/denier, and still more preferably from about 5 g/denier to about 10 g/denier. Higher or lower tenacity fibers are also useful provided that their tenacities are lower than the fibers of the second fibrous plies. In this regard, fibers such as nylon fibers, polyester fibers, polypropylene fibers or polyolefin fibers, or a combination thereof, which have tenacities of less than 5 g/denier are also useful herein. Of these fiber types, nylon fibers are most preferred, particularly 420 denier or 840 denier nylon fibers and fabrics formed therefrom, which are widely commercially available. A particularly preferred third fibrous material section comprises a woven fabric formed from 840 denier nylon fibers, such as woven fabrics having a 26×26 plain weave construction and an areal density of 200 g/m², which is commercially available. Also suitable are CORDURA® brand nylon fabrics commercially available from Invista North America S.A R.L. of Wilmington, Del. Particularly preferred nylon fibers are nylon 6 fibers, nylon 6,6 fibers and nylon 4,6 fibers.

Alternatively, the third section may be a non-fibrous material, such as a polymer sheet, a metal sheet or an energy mitigating material such as a foam. Preferred polymer sheets include one or more isotropic polymer layers, which are isotropic in regard to their physical properties. Suitable isotropic polymer layers may be formed from polymers such as acrylics, nylons (such as nylon 6; nylon 6,6; or nylon 4,6), polyolefins, epoxies, silicones, polyesters, polycarbonate or polyvinyl chlorides, but this list is non-exclusive. Methods of making isotropic polymer layers are conventionally known. Suitable metal sheets non-exclusively include high hardness steel (HHS), aluminum alloys, titanium or a combination thereof. Suitable open-cell foams non-exclusively include polyurethane foams, polyethylene foams, polyvinyl chloride (PVC) foams, and other thermoplastic resin foams. Polyurethane foams are the most common. Open-cell foams are commercially available and are described, for example, in U.S. Pat. Nos. 6,174,741, 6,093,752, 5,824,710, 5,114,773 and 4,957,798, the disclosures of which are incorporated herein by reference. Foams are also described in the publication *Handbook of Plastic Foams*, by Arthur H. Landrock, Noves Publication (1995). Foam raw material manufacturers include The Dow Chemical Company of Midland, Mich. and Bayer Corporation of Pittsburgh, Pa. Foam converters (from liquid to flexible foams) include American Excelsior Corp. of Texas, Foamtech Corporation of Massachusetts, Wisconsin Foam Products of Wisconsin, UFP Technologies of Massachusetts, Sealed Air Corporation of New Jersey and McMaster-Carr of Robbinsville, N.J. Rigid, closed-cell foams may also be used, such as such as a vinyl nitrile (e.g., polyvinylchloride (PVC) nitrile) foam, a polyethylene foam, or an ethylene vinyl acetate foam. Examples of suitable commercially available closed cell foams are neoprene/EPDM/SBr (neoprene/ethylene propylene diene monomer/styrene-butadiene rubber) closed cell foams commercially available from McMaster-Carr of Robbinsville, N.J.; United Foam XRD 15 PCF polyethylene commercially available from UFP Technologies of Raritan, N.J. (manufactured by Qycell Corporation of Ontario, Calif.). The "Adhesive Backed Open Cell Foam" used in Comparative Examples 7-9 was a 0.25 inch thick water-resistant, super-cushioning open cell polyurethane foam with an adhesive backing, commercially available from McMaster-Carr.

For the purposes of the present invention, a "fiber" is an elongate body the length dimension of which is much greater than the transverse dimensions of width and thickness. The cross-sections of fibers for use in this invention may vary widely, and they may be circular, flat or oblong in cross-section. They also may be of irregular or regular multi-lobal cross-section having one or more regular or irregular lobes projecting from the linear or longitudinal axis of the filament. Thus the term "fiber" includes filaments, ribbons, strips and the like having regular or irregular cross-section. It is preferred that the fibers have a substantially circular cross-section. As used herein, the term "yarn" is defined as a single strand consisting of multiple fibers. A single fiber may be formed from just one filament or from multiple filaments. A fiber formed from just one filament is referred to herein as either a "single-filament" fiber or a "monofilament" fiber, and a fiber formed from a plurality of filaments is referred to herein as a "multifilament" fiber. The term "denier" is a unit of linear density equal to the mass in grams per 9000 meters of fiber/yarn. In this regard, the fibers may be of any suitable denier. For example, fibers may have a denier of from about 50 to about 5000 denier, more preferably from about 200 to 5000 denier, still more preferably from about 650 to about 3000 denier, and most preferably from about 800 to about 1500 denier. The selection is governed by considerations of ballistic effectiveness and cost. Finer fibers are more costly to manufacture and to weave, but can produce greater ballistic effectiveness per unit weight.

The "tenacity" of a fiber refers to the tensile stress expressed as force (grams) per unit linear density (denier) of an unstressed specimen. The term "fibrous ply" as used herein refers to a single array of unidirectionally oriented fibers, a single woven fabric, a single knitted fabric or a single felted fabric. Each fibrous ply will have both an outer top surface and an outer bottom surface and a plurality of "fibrous plies" describes more than one ply of the fibrous structures. A single fibrous ply of unidirectionally oriented fibers comprises an arrangement of fibers that are aligned in a unidirectional, substantially parallel array. This type of fiber arrangement is also known in the art as a "unitape", "unidirectional tape", "UD" or "UDT." As used herein, an "array" describes an orderly arrangement of fibers or yarns, which is exclusive of woven and knitted fabrics, and a "parallel array" describes an orderly, side-by-side, coplanar parallel arrangement of fibers or yarns. The term "oriented" as used in the context of "oriented fibers" refers to the alignment direction of the fibers rather than to stretching of the fibers. The term "fabric" describes structures that may include one or more fiber plies, with or without consolidation/molding of the plies. A non-woven fabric formed from unidirectional fibers typically comprises a plurality of non-woven fiber plies that are stacked on each other surface-to-surface in a substantially coextensive fashion and consolidated. When used herein, a "single-layer" structure refers to any monolithic fibrous structure composed of one or more individual plies, wherein multiple plies have been merged by consolidation or molding techniques. The term "composite" refers to combinations of fibers, optionally but preferably with a polymeric binder material.

The fibers forming each composite of the invention are preferably, but not necessarily, at least partially coated with a polymeric binder material. The polymeric binder material is also commonly referred to in the art as a polymeric "matrix" material. These terms are conventionally known in the art and describe a material that binds fibers together, either by way of its inherent adhesive characteristics or after being subjected to well known heat and/or pressure conditions. As used herein, a "polymeric" binder or matrix material includes resins and rubber. When present, the polymeric binder/matrix material either partially or substantially coats the individual fibers, preferably substantially coating each of the individual filaments/fibers forming a fiber ply or fiber layer.

Suitable polymeric binder materials include both low tensile modulus, elastomeric materials and high tensile modulus, rigid materials. As used herein throughout, the term tensile modulus means the modulus of elasticity, which for polymeric binder materials is measured by ASTM D638. A low or high modulus binder may comprise a variety of polymeric and non-polymeric materials. For the purposes of this invention, a low modulus elastomeric material has a tensile modulus measured at about 6,000 psi (41.4 MPa) or less according to ASTM D638 testing procedures. A low modulus polymer is preferably an elastomer having a tensile modulus of about 4,000 psi (27.6 MPa) or less, more preferably about 2400 psi (16.5 MPa) or less, still more preferably 1200 psi (8.23 MPa) or less, and most preferably is about 500 psi (3.45 MPa) or less. The glass transition temperature (Tg) of the low modulus elastomeric material is preferably less than about 0° C., more preferably the less than about −40° C., and most preferably less than about −50° C. The low modulus elastomeric material also has a preferred elongation to break of at least about 50%, more preferably at least about 100% and most preferably at least about 300%. Whether a low modulus material or a high modulus material, the polymeric binder may also include fillers such as carbon black or silica, may be extended with oils, or may be vulcanized by sulfur, peroxide, metal oxide or radiation cure systems as is well known in the art.

A wide variety of materials and formulations may be utilized as a low modulus polymeric binder. Representative examples include polybutadiene, polyisoprene, natural rubber, ethylene-propylene copolymers, ethylene-propylene-diene terpolymers, polysulfide polymers, polyurethane elastomers, chlorosulfonated polyethylene, polychloroprene, plasticized polyvinylchloride, butadiene acrylonitrile elastomers, poly(isobutylene-co-isoprene), polyacrylates, polyesters, polyethers, fluoroelastomers, silicone elastomers, copolymers of ethylene, polyamides (useful with some fiber types), acrylonitrile butadiene styrene, polycarbonates, and combinations thereof, as well as other low modulus polymers and copolymers curable below the melting point of the fiber. Also useful are blends of different elastomeric materials, or blends of elastomeric materials with one or more thermoplastics.

Particularly useful are block copolymers of conjugated dienes and vinyl aromatic monomers. Butadiene and isoprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type A-B-A, multi-block copolymers of the type $(AB)_n$ (n=2-10) or radial configuration copolymers of the type $R—(BA)_x$ (x=3-150); wherein A is a block from a polyvinyl aromatic monomer and B is a block from a conjugated diene elastomer. Many of these polymers are produced commercially by Kraton Polymers of Houston, Tex. and described in the bulletin "Kraton Thermoplastic Rubber", SC-68-81. Also useful are resin dispersions of styrene-isoprene-styrene (SIS) block copolymer sold under the trademark PRINLIN® and commercially available from Henkel Technologies, based in Dusseldorf, Germany. Conventional low modulus polymeric binder polymers employed in ballistic resistant composites include polystyrene-polyisoprene-polystyrene block copolymers sold under the trademark KRATON® commercially produced by Kraton Polymers.

While low modulus polymeric binder materials are preferred for the formation of flexible armor materials, high modulus polymeric binder materials are preferred for the formation of rigid armor articles. High modulus, rigid materials generally have an initial tensile modulus greater than 6,000 psi. Useful high modulus, rigid polymeric binder materials include polyurethanes (both ether and ester based), epoxies, polyacrylates, phenolic/polyvinyl butyral (PVB) polymers, vinyl ester polymers, styrene-butadiene block copolymers, as well as mixtures of polymers such as vinyl ester and diallyl phthalate or phenol formaldehyde and polyvinyl butyral. A particularly useful rigid polymeric binder material is a thermosetting polymer that is soluble in carbon-carbon saturated solvents such as methyl ethyl ketone, and possessing a high tensile modulus when cured of at least about $1 \times 10^6$ psi (6895 MPa) as measured by ASTM D638. Particularly useful rigid polymeric binder materials are those described in U.S. Pat. No. 6,642,159, the disclosure of which is incorporated herein by reference.

Most specifically preferred are polar resins or polar polymers, particularly polyurethanes within the range of both soft and rigid materials at a tensile modulus ranging from about 2,000 psi (13.79 MPa) to about 8,000 psi (55.16 MPa). Preferred polyurethanes are applied as aqueous polyurethane dispersions that are most preferably, but not necessarily, cosolvent free. Such includes aqueous anionic polyurethane dispersions, aqueous cationic polyurethane dispersions and aqueous nonionic polyurethane dispersions. Particularly preferred are aqueous anionic polyurethane dispersions; aqueous aliphatic polyurethane dispersions, and most preferred are aqueous anionic, aliphatic polyurethane dispersions, all of which are preferably cosolvent free dispersions. Such includes aqueous anionic polyester-based polyurethane dispersions; aqueous aliphatic polyester-based polyurethane dispersions; and aqueous anionic, aliphatic polyester-based polyurethane dispersions, all of which are preferably cosolvent free dispersions. Such also includes aqueous anionic polyether polyurethane dispersions; aqueous aliphatic polyether-based polyurethane dispersions; and aqueous anionic, aliphatic polyether-based polyurethane dispersions, all of which are preferably cosolvent free dispersions. Similarly preferred are all corresponding variations (polyester-based; aliphatic polyester-based; polyether-based; aliphatic polyether-based, etc.) of aqueous cationic and aqueous nonionic dispersions. Most preferred is an aliphatic polyurethane dispersion having a modulus at 100% elongation of about 700 psi or more, with a particularly preferred range of 700 psi to about 3000 psi. More preferred are aliphatic polyurethane dispersions having a modulus at 100% elongation of about 1000 psi or more, and still more preferably about 1100 psi or more. Most preferred is an aliphatic, polyether-based anionic polyurethane dispersion having a modulus of 1000 psi or more, preferably 1100 psi or more.

When a composite does include a binder, the total weight of the binder comprising the composite preferably comprises from about 2% to about 50% by weight, more preferably from about 5% to about 30%, more preferably from about 7% to about 20%, and most preferably from about 11% to about 16% by weight of the fibers plus the weight of the binder. A lower binder content is appropriate for woven and knitted fabrics, wherein a polymeric binder content of greater than zero but less than 10% by weight of the fibers plus the weight of the binder is typically most preferred, but this is not intended as strictly limiting. For example, phenolic/PVB impregnated woven aramid fabrics are sometimes fabricated with a higher resin content of from about 20% to about 30%, although about 12% content is typically preferred. Typically, weaving or knitting of fabrics is performed prior to coating the fibers with an optional polymeric binder, wherein the fabrics are thereafter impregnated with the binder.

Methods for applying a polymeric binder material to fibers to thereby impregnate fiber plies/layers with the binder are well known and readily determined by one skilled in the art. The term "impregnated" is considered herein as being synonymous with "embedded," "coated," or otherwise applied with a polymeric coating where the binder material diffuses into the fiber ply/layer and is not simply on a surface of the ply/layer. Any appropriate application method may be utilized to apply the polymeric binder material and particular use of a term such as "coated" is not intended to limit the method by which it is applied onto the filaments/fibers. Useful methods include, for example, spraying, extruding or roll coating polymers or polymer solutions onto the fibers, as well as transporting the fibers through a molten polymer or polymer solution. Most preferred are methods that substantially coat or encapsulate each of the individual fibers and cover all or substantially all of the fiber surface area with the polymeric binder material.

As previously stated, each of the fibrous materials, including the first, second and third fibrous materials, may comprise woven fabrics, non-woven fabrics formed from unidirectionally oriented fibers, non-woven felted fabrics formed from randomly oriented fibers, or knitted fabrics. Woven fabrics may be formed using techniques that are well known in the art using any fabric weave, such as plain weave, crowfoot weave, basket weave, satin weave, twill weave, three dimensional woven fabrics, and any of their several variations. Plain weave is most common, where fibers are woven together in an orthogonal 0°/90° orientation, and is preferred. More preferred are plain weave fabrics having an equal warp and weft count. In one embodiment, a single layer of woven fabric preferably has from about 15 to about 55 fiber/yarn ends per inch (about 5.9 to about 21.6 ends per cm) in both the warp and fill directions, and more preferably from about 17 to about 45 ends per inch (about 6.7 to about 17.7 ends per cm). The fibers/yarns forming the woven fabric preferably have a denier of from about 375 to about 1300. The result is a woven fabric weighing preferably from about 5 to about 19 ounces per square yard (about 169.5 to about 644.1 g/m$^2$), and more preferably from about 5 to about 11 ounces per square yard (about 169.5 to about 373.0 g/m$^2$). Examples of such woven fabrics are those designated as SPECTRA® fabric styles 902, 903, 904, 952, 955 and 960 available from JPS Composite Materials of Anderson, S.C. or other commercial weavers, fabricated with SPECTRA® fibers from Honeywell International Inc. Other exemplary woven fabrics include fabrics formed from basket weaves, such as SPECTRA® fabric style 912. Examples of aramid-based woven fabrics are those designated as KEVLAR® fabric styles 704, 705, 706, 708, 710, 713, 720, 745 and 755 available from DuPont and TWARON® fabric styles 5704, 5716 and 5931, which are commercially available from Kolon Industries, Inc.

Knit fabric structures are constructions composed of intermeshing loops, with the four major types being tricot, raschel, net and oriented structures. Due to the nature of the loop structure, knits of the first three categories are not as suitable as they do not take full advantage of the strength of a fiber. Oriented knitted structures, however, use straight inlaid yarns held in place by fine denier knitted stitches. The fibers are very straight without the crimp effect found in woven fabrics due to the interlacing effect on the yarns. These laid in yarns can be oriented in a monoaxial, biaxial or multi-axial direction depending on the engineered requirements. It is preferred that the specific knit equipment used in laying in the load bearing yarns is such that the yarns are not pierced through.

Felts may also be formed by one of several techniques known in the art, such as by carding or fluid laying, melt blowing and spin laying. A felt is a non-woven network of randomly oriented fibers, preferably at least one of which is a discontinuous fiber, preferably a staple fiber having a length ranging from about 0.25 inch (0.64 cm) to about 10 inches (25.4 cm).

A non-woven unidirectional fibrous ply of the invention may be formed by conventional methods in the art. For example, in a preferred method of forming a non-woven unidirectional fibrous ply, a plurality of fibers are arranged into an array, typically being arranged as a fiber web comprising a plurality of fibers aligned in a substantially parallel, unidirectional array. In a typical process, fiber bundles are supplied from a creel and led through guides and one or more spreader bars into a collimating comb. This is typically followed by coating the fibers with a polymeric binder material. A typical fiber bundle will have from about 30 to about 2000 individual fibers. The spreader bars and collimating comb disperse and spread out the bundled fibers, reorganizing them side-by-side in a coplanar fashion. Ideal fiber spreading results in the individual filaments or individual fibers being positioned next to one another in a single fiber plane, forming a substantially unidirectional, parallel array of fibers without fibers overlapping each other. Similar to woven fabrics, a single ply of woven fabric preferably has from about 15 to about 55 fiber/yarn ends per inch (about 5.9 to about 21.6 ends per cm), and more preferably from about 17 to about 45 ends per inch (about 6.7 to about 17.7 ends per cm). Next, if the fibers are to be coated with a matrix/binder, the coating is applied according to conventional methods and is then typically dried followed by forming the coated fibers into a single-ply of a desired length and width. Uncoated fibers may be bound together with an adhesive film, by bonding the fibers together with heat, or any other known method, to thereby form a single-ply.

Whether unidirectional non-woven, felted non-woven, woven or knitted, a plurality of fibrous plies may be merged together according to conventional methods in the art to form each individual section of the ballistic resistant composite. In this regard, a plurality of single plies of the selected fabric/fibrous ply type are stacked on top of each other in coextensive fashion and merged, i.e. consolidated, together. When a section (e.g. the first fibrous material, or the second fibrous material, or the third fibrous material, etc.) comprises felted non-woven, woven or knitted fibrous plies, each section of fibrous material preferably includes from about 2 to about 100 fibrous plies, more preferably from about 2 to about 85 fibrous plies, and most preferably from about 2 to about 65 fibrous plies. When a section comprises a plurality of unidirectional non-woven fibrous plies, it is typical for a plurality of such plies to first be formed into a 2-ply or 4-ply unidirectional non-woven fiber "layer," also referred to in the art as a "pre-preg," prior to combining a plurality of such "layers" or "pre-pregs" together to form the section. Each "layer" or "pre-preg" typically includes from 2 to about 6 fibrous plies, typically being cross-plied at 0°/90°, but may include as many as about 10 to about 20 fibrous plies as may be desired for various applications, with the layers also being cross-plied at alternating 0°/90° orientations. When a section (e.g. the first fibrous material, or the second fibrous material, or the third fibrous material, etc.) comprises such non-woven unidirectional fiber "layers," the section preferably comprises from 2 to about 100 fiber layers, more preferably from about 2 to about 85 fiber layers, and most preferably from about 2 to about 65 fiber layers. The total number of fibrous plies in each of the first fibrous material, second fibrous material, optional third fibrous material and any additional fibrous materials may be different or may be the same, wherein the layers are of any suitable thickness. The greater the number of total plies in a section translates to greater ballistic resistance, but also greater weight.

With particular regard to fibrous materials comprising unidirectional non-woven fibrous plies, it is conventionally known in the art that excellent ballistic resistance is achieved when the individual fibrous plies are coextensively stacked upon each other are cross-plied such that the such that the unidirectionally oriented fibers in each fibrous ply are oriented in a non-parallel longitudinal fiber direction relative to the longitudinal fiber direction of each adjacent ply. Most preferably, the fibrous plies are cross-plied orthogonally at 0° and 90° angles wherein the angle of the fibers in even numbered layers is preferably substantially the same and the angle of the fibers in odd numbered layers is preferably substantially the same, but adjacent plies can be aligned at virtually any angle between about 0° and about 90° with respect to the longitudinal fiber direction of another ply. For example, a five ply non-woven structure may have plies oriented at a 0°/45°/90°/45°/0° or at other angles. Such rotated unidirectional alignments are described, for example, in U.S. Pat. Nos. 4,457,985; 4,748,064; 4,916,000; 4,403,012; 4,623,574; and 4,737,402, all of which are incorporated herein by reference to the extent not incompatible herewith. Typically, the fibers in adjacent plies will be oriented at an angle of from 45° to 90°, preferably 60° to 90°, more preferably 80° to 90° and most preferably at about 90° relative to each other.

Each of the first fibrous material, second fibrous material, optional third fibrous material and any additional fibrous materials may be formed from identical fiber types or different fiber types, and may include the same matrix/binder type or different matrix/binder types. In one embodiment, the fibers and polymeric binder forming the first fibrous material are both chemically the same as the fibers and polymeric binder forming the second fibrous material. For example, each fibrous material may comprise ultra-high molecular weight polyethylene fibers coated with a polyurethane binder. In another embodiment, the fibers and polymeric binder forming the first fibrous material are both chemically different than the fibers and polymeric binder forming the second fibrous material. For example, the first fibrous material may comprise ultra-high molecular weight polyethylene fibers coated with a polyurethane binder while the second composite comprise aramid fibers coated with a polystyrene-polyisoprene-polystyrene block copolymer binder.

In a preferred three fibrous section article embodiment ($1^{st}$ fibrous material/$2^{nd}$ fibrous material/$3^{rd}$ fibrous material), each of the first fibrous material and the second fibrous material comprise fibers coated with a polymeric binder, wherein the fibers and the binder forming the first fibrous material are both chemically the same as the fibers and binder forming the second fibrous material, with the fibers of the second fibrous material having a lower tenacity. However, the third fibrous material is preferably comprised of fibers that are chemically different than the fibers of each of the first and second fibrous materials, which fibers have a lower tenacity than the fibers of both the first fibrous material and the second fibrous material. In said embodiment, the third fibrous material may also include a polymeric binder that is either chemically the same as or chemically different than the binder of each of the other fibrous material sections. For example, the first fibrous material may comprise aramid fiber based fibrous plies coated with a polyurethane based binder, the second fibrous material may comprise aramid fiber based fibrous plies coated with a polyurethane based binder, and the third fibrous material may comprise nylon fibers coated with a polyurethane based binder. In another example, the first fibrous material may comprise polyethylene fiber based fibrous plies coated with a polyurethane based binder, the second fibrous material may comprise polyethylene fiber based fibrous plies coated with a polyurethane based binder, and the third fibrous material may comprise nylon fibers coated with a polyurethane based binder.

The sections of fibrous material individually may be the same or different in fabric structure (e.g., woven, knitted, unidirectional non-woven or felted non-woven) relative to each other. Most preferably, the ballistic resistant articles are formed by a combination of different types of fabrics forming a hybrid structure. In one preferred embodiment, a three section composite is formed wherein all of the fibrous plies of the first fibrous material are woven plies, all the fibrous plies of the second fibrous material are unidirectional non-woven plies, and all of the fibrous plies of the third fibrous material are woven plies. In another preferred embodiment, all of the fibrous plies of the first fibrous material are woven plies, all the fibrous plies of the second fibrous material are unidirectional non-woven plies, and all of the fibrous plies of the third fibrous material are felted non-woven plies. In yet another preferred embodiment, all of the fibrous plies of the first fibrous material are unidirectional non-woven plies, all the fibrous plies of the second fibrous material are woven plies, and all of the fibrous plies of the third fibrous material are unidirectional non-woven plies.

In still other embodiments, some fibrous material sections may comprise a greater amount of polymeric binder than other fibrous material sections, or some fibrous material sections may comprise a polymeric binder while other fibrous material sections have no polymeric binder (i.e. are matrix-free). In one preferred three fibrous material section embodiment, the second fibrous material section has greater polymeric binder content than the first fibrous material section. This embodiment will increase the stiffness of the second fibrous material section to therefore reduce trauma. The third fibrous material in this embodiment may or may not include a polymeric binder.

The type and number of fibrous plies affects the areal density of a ballistic resistant composite article, and the total number of fibrous plies in a ballistic resistant article provided herein will vary depending upon the ultimate end use of the article. For example, in body armor vests for military applications, in order to form an article that achieves an areal density of 1.0 lb/ft$^2$ (psf) (4.88 kg/m$^2$ (ksm)), a total of at 22 individual 2-ply (e.g. 0°/90°) layers may be required. Minimum levels of body armor ballistic resistance for military use are categorized by National Institute of Justice (NIJ) Threat Levels, as is well known in the art.

Each fibrous material section of the invention has an areal density of at least 100 g/m$^2$, preferably having an areal density of at least 200 g/m$^2$ and more preferably having an areal density of at least 976 g/m$^2$. In preferred embodiments, the sum of the first fibrous material, second fibrous material, a third fibrous material or non-fibrous third section, and any additional fibrous materials produces a ballistic resistant material having a total combined areal density of from about 0.5 psf (2.44 ksm) to about 8.0 psf (39.04 ksm), more preferably from about 0.5 psf (2.44 ksm) to about 5.0 psf (24.4 ksm), still more preferably from about 0.5 psf (2.44 ksm) to about 3.5 psf (17.08 ksm), still more preferably from about 0.75 psf (3.66 ksm) to about 3.0 psf (14.64 ksm), still more preferably from about 0.75 psf (3.66 ksm) to about 1.5 psf (7.32 ksm), and most preferably from about 0.9 psf (4.392 ksm) to about 1.5 psf (7.32 ksm).

As previously stated, in use, the first fibrous material section is preferably positioned as the front "strike face" section of the ballistic resistant material, i.e. the section that a projectile threat will strike first. For maximum backface signature resistance performance, when the first fibrous material is positioned as the strike face section, this first section preferably has an areal density of greater than 50% of the total combined areal density of the entire composite article. In one embodiment, the areal density of the first fibrous material section is greater than about 60% of the total combined areal density of all combined sections. In another embodiment, the areal density of the first fibrous material section is greater than about 70% of the total combined areal density of all combined sections. In most preferred embodiments, the first fibrous material section comprises from about 60% to about 75% of the total combined areal density of all the composite article sections combined, the second fibrous material comprises from about 20% to about 30% of the total combined areal density of all the composite article sections, and the third section (fibrous or not) comprises from about 5% to about 10% of the total combined areal density of all the composite article sections. In another embodiment, the areal density of the first composite may be equal to the areal density of the second composite. In a preferred three composite ($1^{st}/2^{nd}/3^{rd}$) article, the first and third composites combined comprise from about 60% to about 75% of the total combined areal density and the second composite comprises from about 25% to about 40% of the total combined areal density. In a specifically preferred three fibrous composite ($1^{st}/2^{nd}/3^{rd}$) configuration, the first and third composites combined comprise about 75% of the total combined areal density and the second composite comprises about 25% of the total combined areal density. In another specifically preferred three fibrous composite ($1^{st}/2^{nd}/3^{rd}$) configuration, the first and third composites combined comprise about 63% of the total combined areal density and the second composite comprises about 37% of the total combined areal density. These asymmetrical, unbalanced configurations are specifically preferred because they exhibit a combination of superior ballistic penetration resistance and maximum backface signature resistance performance.

The thickness of each fibrous material section will correspond to the thickness of the individual fibers and the number of fiber plies/layers incorporated into the composite. For example, a preferred wove fabric, knitted fabric or felted non-woven fabric will have a preferred thickness of from about 25 μm to about 600 μm per ply/layer, more preferably from about 50 μm to about 385 μm and most preferably from about 75 μm to about 255 μm per ply/layer. A preferred two-ply unidirectional non-woven fabric composite will have a preferred thickness of from about 12 μm to about 600 μm, more preferably from about 50 μm to about 385 μm and most preferably from about 75 μm to about 255 μm. A preferred isotropic polymer sheet or metal sheet will have a preferred thickness of from about 12 μm to about 600 μm, more preferably from about 75 μm to about 385 μm and most preferably from about 125 μm to about 255 μm.

When forming the articles provided herein, all the plies comprising all of the different section may be overlapped on top of each other to form a stack followed by consolidating the plurality of layers together at once, or each section may first be consolidated individually followed by merging the consolidated sections together. Merging of the fibrous layers and sections into single-layer composite structures may be accomplished using conventional techniques in the art, such as consolidation or molding techniques. In this regard, merging using no pressure or low pressure is often referred to in the art as "consolidation" while high pressure merging is often referred to as "molding," but these terms are also frequently used interchangeably.

In the preferred embodiments, each stack of overlapping non-woven fiber plies (unidirectional or felted), woven fabric plies, knitted fabric plies or a combination thereof is merged under heat and pressure, or by adhering the coatings of individual fibrous plies to each other, to thereby form a single-layer, monolithic element. Methods of consolidating fibrous plies/layers are well known, such as by the methods described in U.S. Pat. No. 6,642,159. Consolidation can occur via drying, cooling, heating, pressure or a combination thereof. Heat and/or pressure may not be necessary, as the fibers or fibrous plies may just be glued together with an adhesive as is the case in a wet lamination process. Consolidation may be performed at temperatures ranging from about 50° C. to about 175° C., preferably from about 105° C. to about 175° C., and at pressures ranging from about 5 psig (0.034 MPa) to about 2500 psig (17 MPa), for from about 0.01 seconds to about 24 hours, preferably from about 0.02 seconds to about 2 hours. When heating, it is possible that a present polymeric binder coating can be caused to stick or flow without completely melting. However, generally, if the polymeric binder material is caused to melt, relatively little pressure is required to form the composite, while if the binder material is only heated to a sticking point more pressure is typically required. As is conventionally known in the art, consolidation may be conducted in a calendar set, a flat-bed laminator, a press or in an autoclave. Consolidation may also be conducted by vacuum molding the material in a mold that is placed under a vacuum. Vacuum molding technology is well known in the art. Most commonly, a plurality of orthogonal fiber webs are "glued" together with the binder polymer and run through a flat-bed laminator to improve the uniformity and strength of the bond.

Alternately, merging of the fibrous plies may be achieved by molding under heat and pressure in a suitable molding apparatus. Generally, molding is conducted at a pressure of from about 50 psi (344.7 kPa) to about 5,000 psi (34,470 kPa), more preferably about 100 psi (689.5 kPa) to about 3,000 psi (20,680 kPa), most preferably from about 150 psi (1,034 kPa) to about 1,500 psi (10,340 kPa). Molding may alternately be conducted at higher pressures of from about 5,000 psi (34,470 kPa) to about 15,000 psi (103,410 kPa), more preferably from about 750 psi (5,171 kPa) to about 5,000 psi, and more preferably from about 1,000 psi to about 5,000 psi. The molding step may take from about 4 seconds to about 45 minutes. Preferred molding temperatures range from about 200° F. (~93° C.) to about 350° F. (~177° C.), more preferably at a temperature from about 200° F. to about 300° F. and most preferably at a temperature from about 200° F. to about 280° F. The pressure under which the fibrous plies are molded has a direct effect on the stiffness or flexibility of the resulting molded product. Particularly, the higher the pressure at which they are molded, the higher the stiffness, and vice-versa. In addition to the molding pressure, the quantity, thickness and composition of the fibrous plies and polymeric binder coating type also directly affects the stiffness of composite.

While each of the molding and consolidation techniques described herein are similar, each process is different. Particularly, molding is a batch process and consolidation is a generally continuous process. Further, molding typically involves the use of a mold, such as a shaped mold or a match-die mold when forming a flat panel, and does not necessarily result in a planar product. Normally consolidation is done in a flat-bed laminator, a calendar nip set or as a wet lamination to produce soft (flexible) body armor fabrics. Molding is typically reserved for the manufacture of hard armor, e.g. rigid plates. In either process, suitable temperatures, pressures and times are generally dependent on the type of polymeric binder coating materials, polymeric binder content, process used and fiber type.

Alternative consolidation methods are also applicable when merging a plurality of woven fabrics, knitted fabrics or felted non-woven fabrics. For example, a plurality of woven fabrics may be interconnected with each other using 3D weaving methods, such as by weaving warp and weft threads into a stack of woven fabrics both horizontally and vertically. A plurality of woven or non-woven fabrics may also be attached to each other by mechanical attachment such as stitching/needle punching fabrics together in the z-direction. Similar techniques may be employed for merging a plurality of knitted fabrics. Felted fibrous plies may be consolidated mechanically such as by needle punching, stitch-bonding, hydro-entanglement, air entanglement, spin bonding, spin lacing or the like, chemically such as with an adhesive, or thermally with a fiber to point bond or a blended fiber with a lower melting point. The preferred consolidation method is needle punching alone or followed by one of the other methods. The preferred felt is a needle punched felt.

When the fibrous plies or sections of fibrous plies are attached to each other with an intermediate, suitable adhesives non-exclusively include elastomeric materials such as polyethylene, cross-linked polyethylene, chlorosulfonated polyethylene, ethylene copolymers, polypropylene, propylene copolymers, polybutadiene, polyisoprene, natural rubber, ethylene-propylene copolymers, ethylene-propylene-diene terpolymers, polysulfide polymers, polyurethane elastomers, polychloroprene, plasticized polyvinylchloride using one or more plasticizers that are well known in the art (such as dioctyl phthalate), butadiene acrylonitrile elastomers, poly (isobutylene-co-isoprene), polyacrylates, polyesters, unsaturated polyesters, polyethers, fluoroelastomers, silicone elastomers, copolymers of ethylene, thermoplastic elastomers, phenolics, polybutyrals, epoxy polymers, styrenic block copolymers, such as styrene-isoprene-styrene or styrene-butadiene-styrene types, and other suitable adhesive compositions conventionally known in the art. Particularly preferred adhesives include methacrylate adhesives, cyanoacrylate adhesives, UV cure adhesives, urethane adhesives, epoxy adhesives and blends of the above materials. Of these, an adhesive comprising a polyurethane thermoplastic adhesive, particularly a blend of one or more polyurethane thermoplastics with one or more other thermoplastic polymers, is preferred. Most preferably, the adhesive comprises polyether aliphatic polyurethane. Such adhesives may be applied, for example, in the form of a hot melt, film, paste or spray, or as a two-component liquid adhesive.

The individual plies of individual fibrous material sections may also be joined together by other suitable means for direct attachment such as stitching, bolting, screwing or needle punching, such that their surfaces contact each other, or a combination of any of the above methods. The individual plies of each individual section may also remain unconsolidated, followed by consolidating/molding a unit comprising multiple unconsolidated composite sections together in a single step, optionally wherein each of the individual sections are stitched together to maintain their integrity prior to the single unitary consolidation/molding step.

Regardless of the method used to join the plies of each individual section, all of the sections of the composite article are to be bonded together by high pressure molding or consolidation with an intermediate polymer layer or adhesive, or by employing an existing polymeric binder coating as an adhesive to aid in bonding the different sections together, to thereby form a consolidated, unitary composite article. This specifically excludes stitching as a sole means of attaching the different sections together. It has been found that bonding the sections together by molding or adhesive consolidation will increase inter-laminar strength between the different sections, which translates to higher stiffness and reduced trauma, i.e. improved backface signature performance.

The ballistic resistant composites of the invention may also optionally comprise one or more thermoplastic polymer layers attached to one or both of their outer surfaces. Suitable polymers for the thermoplastic polymer layer non-exclusively include polyolefins, polyamides, polyesters (particularly polyethylene terephthalate (PET) and PET copolymers), polyurethanes, vinyl polymers, ethylene vinyl alcohol copolymers, ethylene octane copolymers, acrylonitrile copolymers, acrylic polymers, vinyl polymers, polycarbonates, polystyrenes, fluoropolymers and the like, as well as co-polymers and mixtures thereof, including ethylene vinyl acetate (EVA) and ethylene acrylic acid. Also useful are natural and synthetic rubber polymers. Of these, polyolefin and polyamide layers are preferred. The preferred polyolefin is a polyethylene. Non-limiting examples of useful polyethylenes are low density polyethylene (LDPE), linear low density polyethylene (LLDPE), medium density polyethylene (MDPE), linear medium density polyethylene (LMDPE), linear very-low density polyethylene (VLDPE), linear ultra-low density polyethylene (ULDPE), high density polyethylene (HDPE) and co-polymers and mixtures thereof. Also useful are SPUNFAB® polyamide webs commercially available from Spunfab, Ltd, of Cuyahoga Falls, Ohio (trademark registered to Keuchel Associates, Inc.), as well as THERMOPLAST™ and HELIOPLAST™ webs, nets and films, commercially available from Protechnic S.A. of Cernay, France.

Any thermoplastic polymer layers are preferably very thin, having preferred layer thicknesses of from about 1 µm to about 250 µm, more preferably from about 5 µm to about 25 µm and most preferably from about 5 µm to about 9 µm. Discontinuous webs such as SPUNFAB® non-woven webs are preferably applied with a basis weight of 6 grams per square meter (gsm). While such thicknesses are preferred, it is to be understood that other thicknesses may be produced to satisfy a particular need and yet fall within the scope of the present invention.

Such thermoplastic polymer layers may be bonded to the composite surfaces using well known techniques, such as thermal lamination. Typically, laminating is done by positioning the individual layers on one another under conditions of sufficient heat and pressure to cause the layers to combine into a unitary structure. Lamination may be conducted at temperatures ranging from about 95° C. to about 175° C., preferably from about 105° C. to about 175° C., at pressures ranging from about 5 psig (0.034 MPa) to about 100 psig (0.69 MPa), for from about 5 seconds to about 36 hours, preferably from about 30 seconds to about 24 hours. Such thermoplastic polymer layers may alternatively be bonded to the composite surfaces with hot glue or hot melt fibers as would be understood by one skilled in the art.

In use, the multi-section ballistic resistant composite articles may be provided with a cover into which the materials are positioned. Soft body armor covers include woven fabrics, for example, woven fabrics made from nylon, cotton, and/or other fibers. One particularly preferred cover material is a rip stop woven fabric, preferably a rip stop woven nylon fabric which is formed from 70 denier nylon fibers having a weight of 95 g/m² and is typically coated with a polyurethane resin on at least one its surfaces. Such fabrics are known in the art and are typically made by weaving nylon threads throughout a base material in interlocking patterns. These fabrics are very resistant to tearing and ripping. The cover may be sealed closed via conventional means in the art, such as stitching. The cover may alternatively be formed from a material that can be welded or heat sealed, which is of particular interest where barrier properties are desired, such as moisture or solvent barriers. The consolidated, unitary, multi-section composite article may or may not be bonded to the optional cover. In one exemplary embodiment where a three-section composite article is positioned in a cover, either loosely or where the article is bonded to the cover, the third fibrous material section may be formed from nylon fibers such that a section of nylon fibers is included within a cover that is also made from nylon fibers.

The ballistic resistant composites provided herein may be used to form articles having superior ballistic penetration resistance. Articles having superior ballistic penetration resistance are those which exhibit excellent properties defending against penetration by deformable projectiles, such as bullets, and against penetration of fragments, such as shrapnel. The ballistic resistant composites are also suitable for body armor applications that require low backface deformation, i.e. optimal blunt trauma resistance, including flexible, soft armor articles as well as rigid, hard armor articles, as well as for the defense of vehicles and structural elements, such as building walls.

The following examples serve to illustrate the invention.

Examples 1-4

Four different types of shoot packs were prepared from the materials identified below and tested for ballistic penetration resistance and backface signature performance:

Materials

1. GOLD FLEX®

GOLD FLEX®, commercially available from Honeywell International Inc. of Morristown, N.J., is a highly flexible four-ply unidirectional non-woven fabric formed from aramid fibers having a breaking tenacity of 2350 mN/tex. The fibers in each ply are parallel to each other and are oriented orthogonally relative to the fibers in each adjacent ply (conventional 0°/90°/0°/90° construction). The fibers are coated with a polyisoprene-polystyrene-block copolymer based binder resin. The four aramid plies were laminated between two linear low density polyethylene (LLDPE) films, each having a thickness of 9 μm and an areal density of 8 g/m$^2$, positioning said LLDPE layers on both outer surfaces of the fabric.

2. GOLD SHIELD® GA-2010

GOLD SHIELD® GA-2010, commercially available from Honeywell International Inc., is a highly flexible two-ply unidirectional non-woven fabric formed from aramid fibers having a breaking tenacity of 2025 mN/tex. The fibers in each ply are parallel to each other and are oriented orthogonally relative to the fibers in each adjacent ply (conventional 0°/90° construction). The fibers are coated with a polyisoprene-polystyrene-block copolymer based binder resin. The two aramid plies were laminated between two linear low density polyethylene (LLDPE) films, each having a thickness of 9 μm and an areal density of 8 g/m$^2$, positioning said LLDPE layers on both outer surfaces of the fabric.

3. Nylon Fabric

A 26×26 plain weave woven fabric formed with nylon fibers having a tenacity below 800 mN/tex and a denier of 840. The fabric has an areal density of 200 g/m$^2$.

Ballistic Testing Methods

Each shoot pack identified below was tested for ballistic performance against a 9 mm Full Metal Jacket Remington bullet. Each shoot pack was mounted on a steel test frame measuring 610 mm×610 mm×140 mm±2 mm and held in place with stretchable 2" wide bands. The steel frame was filled and compacted with Roma Plastilina #1 clay as recommended by NIJ 0101.04 and NIJ 0101.06. The steel frame was mounted at a 90° orientation to the line of bullets being fired from a firmly mounted universal receiver. Before testing, the clay inside steel frame was calibrated to meet the NIJ 0101.04 and NIJ 0101.06 standards.

To achieve National Institute of Justice NIJ0101.04 and NIJ0101.06 compliance of a vest and shoot pack construction, each material construction must successfully complete a two-part performance test series, one for ballistic penetration resistance and the other for backface signature performance.

Backface Signature Test

The standard method for measuring BFS of soft armor is outlined by NIJ Standard 0101.04, Type IIIA, where an armor sample is place in contact with the surface of the deformable Roma Plastilina #1 clay. This NIJ method is conventionally used to obtain a reasonable approximation or prediction of actual BFS that may be expected during a ballistic event in field use for armor that rests directly on or very close to the body of the user. In this test, the depth of a non-penetrating projectile impact in the clay must be 44 mm or less to pass.

$V_{50}$ Projectile Penetration Resistance Test $V_{50}$ data was acquired taken under conventionally known standardized techniques, particularly per the conditions of Department of Defense Test Method Standard MIL-STD-662F. The $V_{50}$ ballistic limit testing is a statistical test that experimentally identifies the velocity at which a bullet has a 50 percent chance of penetrating the flexible shoot pack. Testing is conducted to achieve a $V_{50}$ value within ±15 m/sec based on an average of at least eight bullets fired on each shoot pack where 4 bullets completely penetrate the shoot pack and 4 bullets partially penetrate the shoot pack.

Example 1 (Comparative)

Three identical 40 cm×40 cm square ballistic shoot packs were assembled by forming a stack of 18 overlapping layers of the four-ply GOLD FLEX® fabric specified above. During assembly all of the layers were aligned so that the orientation of the fibers in alternating plies remained orthogonal (0°, 90°, 0°, 90°), (0°, 90°, 0°, 90°), etc., wherein the fibers of all the odd plies were in parallel with each other and the fibers of all the even plies of the shoot pack were in parallel with each other. After stacking all of the 18 total layers, the layers were tack stitched on each of the four corners of the stack and placed into a rip stop nylon cover for ballistic testing. The results of all testing is summarized in Table 1.

TABLE 1

| Material 1 (# of layers) | Material 2 (# of layers) | Material 3 (# of layers) | Areal Density (kg/m$^2$) | $V_{50}$ (m/sec) | Backface Signature (mm) |
|---|---|---|---|---|---|
| 18 | 0 | 0 | 4.20 | 492 | 39 |
| 18 | 0 | 0 | 4.20 | 486 | 38 |
| 18 | 0 | 0 | 4.20 | 484 | 38 |
| | Average | | | 487 | 38 |

Example 2

Three identical 40 cm×40 cm square ballistic shoot packs were assembled by forming a stack of 5 overlapping layers of the four-ply GOLD FLEX® fabric specified above followed by 22 layers of the two-ply GOLD SHIELD® GA-2010 fabric specified above. During assembly all of the layers were aligned so that the orientation of the fibers in alternating plies remained orthogonal (0°, 90°, 0°, 90°), (0°, 90°, 0°, 90°), etc., wherein the fibers of all the odd plies were in parallel with each other and the fibers of all the even plies of the shoot pack were in parallel with each other. After stacking all of the 27 total layers, the layers were tack stitched on each of the four corners of the stack and placed into a rip stop nylon cover for ballistic testing. The results of all testing is summarized in Table 2.

TABLE 2

| Material 1 (# of layers) | Material 2 (# of layers) | Material 3 (# of layers) | Areal Density (kg/m$^2$) | $V_{50}$ (m/sec) | Backface Signature (mm) |
|---|---|---|---|---|---|
| 5 | 22 | 0 | 4.34 | 469 | 33 |
| 5 | 22 | 0 | 4.34 | 466 | 32 |
| 5 | 22 | 0 | 4.34 | 468 | 39 |
| | Average | | | 468 | 35 |

Example 3

Three identical 40 cm×40 cm square ballistic shoot packs were assembled by forming a stack of 5 overlapping layers of the four-ply GOLD FLEX® fabric specified above followed by 9 layers of the two-ply GOLD SHIELD®

GA-2010 fabric specified above and 12 layers of the nylon woven fabric specified above. During assembly all of the layers were aligned so that the orientation of the fibers in alternating plies remained orthogonal (0°, 90°, 0°, 90°), (0°, 90°, 0°, 90°), etc., for each of the GOLD FLEX® and GOLD SHIELD® GA-2010, wherein the fibers of all the odd plies were in parallel with each other and the fibers of all the even plies of the shoot pack were in parallel with each other. For the nylon fabric layers, the longitudinal fiber direction of the weft fibers and the warp fibers, respectively, were kept parallel to the 0°/90° directions of the fibers of the GOLD FLEX® and GOLD SHIELD® GA-2010 plies. After stacking all of the 26 total layers, the layers were tack stitched on each of the four corners of the stack and placed into a rip stop nylon cover for ballistic testing. The results of all testing is summarized in Table 3.

TABLE 3

| Material 1 (# of layers) | Material 2 (# of layers) | Material 3 (# of layers) | Areal Density (kg/m²) | $V_{50}$ (m/sec) | Backface Signature (mm) |
|---|---|---|---|---|---|
| 5 | 9 | 12 | 4.83 | 455 | 33 |
| 5 | 9 | 12 | 4.83 | 453 | 34 |
| 5 | 9 | 12 | 4.83 | 458 | 33 |
| | Average | | | 455 | 33 |

Example 4

Three identical 40 cm×40 cm square ballistic shoot packs were assembled by forming a stack of 5 overlapping layers of the four-ply GOLD FLEX® fabric specified above followed by 9 layers of the two-ply GOLD SHIELD® GA-2010 fabric specified above and 14 layers of the nylon woven fabric specified above. During assembly all of the layers were aligned so that the orientation of the fibers in alternating plies remained orthogonal (0°, 90°, 0°, 90°), (0°, 90°, 0°, 90°), etc., for each of the GOLD FLEX® and GOLD SHIELD® GA-2010, wherein the fibers of all the odd plies were in parallel with each other and the fibers of all the even plies of the shoot pack were in parallel with each other. For the nylon fabric layers, the longitudinal fiber direction of the weft fibers and the warp fibers, respectively, were kept parallel to the 0°/90° directions of the fibers of the GOLD FLEX® and GOLD SHIELD® GA-2010 plies. After stacking all of the 28 total layers, the layers were tack stitched on each of the four corners of the stack and placed into a rip stop nylon cover for ballistic testing. The results of all testing is summarized in Table 3.

TABLE 4

| Material 1 (# of layers) | Material 2 (# of layers) | Material 3 (# of layers) | Areal Density (kg/m²) | $V_{50}$ (m/sec) | Backface Signature (mm) |
|---|---|---|---|---|---|
| 5 | 9 | 14 | 7.42 | 469 | 33 |
| 5 | 9 | 14 | 7.42 | 466 | 32 |
| 5 | 9 | 14 | 7.42 | 468 | 39 |
| | Average | | | 468 | 35 |

CONCLUSIONS

Examples 2, 3 and 4 illustrate that hybrid materials assembled such that the highest tenacity fibrous material is positioned as the strike face which first engages the projectile, followed by a second lower tenacity fibrous material and still lower tenacity third material, will achieve excellent ballistic penetration resistance and backface signature performance at a lower cost than a composite formed from a single material as in Example 1. The first material deforms, fragments and slows down the projectile bullet, and that deformed and fragmented projectile should stop in either the first section or second section of fibrous material. The third material section supports the first two sections of material and distributes the energy which causes backface deformation to a wide area. Since this third set of material is not need to deform and slow down the projectile and projectile fragments, it can be formed from fibers having a lower breaking tenacity or be a non-fibrous material, such as an energy mitigating material.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A ballistic resistant composite comprising:
    a first fibrous material comprising one or more first fibrous plies, each of the first fibrous plies comprising fibers that have a tenacity of greater than 27 g/denier;
    a second fibrous material attached to the first fibrous material, said second fibrous material comprising one or more second fibrous plies, each of the second fibrous plies comprising fibers that have a tenacity lower than the tenacity of the fibers of the first fibrous material; and
    a third fibrous material attached to the second fibrous material, said third fibrous material comprising one or more third fibrous plies, each of the third fibrous plies comprising fibers that have a tenacity lower than the tenacity of the fibers of the second fibrous material;
    wherein the first fibrous material, second fibrous material and third fibrous material are bonded together and form a consolidated, unitary composite article.

2. The ballistic resistant composite of claim 1 wherein each of the fibers of the first fibrous material has a tenacity of 40 g/denier or more.

3. The ballistic resistant composite of claim 1 wherein each of the fibers of the first fibrous material has a tenacity of 45 g/denier or more.

4. The ballistic resistant composite of claim 1 wherein each of the fibers of the second fibrous material has a tenacity of at least 25% less than the tenacity of each of the fibers of the first fibrous material.

5. The ballistic resistant composite of claim 1 wherein each of the fibers of the second fibrous material has a tenacity of 21 g/denier or less.

6. The ballistic resistant composite of claim 1 wherein each of the fibers of the third fibrous material has a tenacity of at least 25% less than the tenacity of each of the fibers of the second fibrous material.

7. The ballistic resistant composite of claim 1 wherein the third fibrous material comprises nylon fibers, polyester fibers, polypropylene fibers, polyolefin fibers or a combination thereof.

8. The ballistic resistant composite of claim 1 wherein the first fibrous material comprises ultra-high molecular weight polyethylene fibers, the second fibrous material comprises either ultra-high molecular weight polyethylene fibers or aramid fibers or a combination thereof, and the third fibrous material comprises nylon fibers.

9. The ballistic resistant composite of claim 1 wherein the first fibrous material is a non-woven fabric comprising a plurality of unidirectionally oriented fibers, the second fibrous material is a non-woven fabric comprising a plurality of unidirectionally oriented fibers, and the third fibrous material is either a non-woven fabric comprising a plurality of unidirectionally oriented fibers, a woven fabric, a knitted fabric or a felt.

10. The ballistic resistant composite of claim 1 further comprising a non-fibrous isotropic layer attached to the third fibrous material, wherein the first fibrous material, second fibrous material, third fibrous material and the non-fibrous isotropic layer are bonded together and form a consolidated, unitary composite article, and wherein said isotropic layer comprises an epoxy, a metal sheet or an energy mitigating foam.

11. The ballistic resistant composite of claim 1 wherein the fibers of the first fibrous material and the fibers of the second fibrous material are substantially coated with a polymeric binder.

12. A ballistic resistant article formed from a ballistic resistant composite, said composite comprising:
  a first fibrous material section comprising one or more first fibrous plies, each of the first fibrous plies comprising fibers that have a tenacity of greater than 27 g/denier;
  a second fibrous material section attached to the first fibrous material section, said second fibrous material section comprising one or more second fibrous plies, each of the second fibrous plies comprising fibers that have a tenacity of at least 50% less than the tenacity of the fibers of the first fibrous material section; and
  a third fibrous material section attached to the second fibrous material section, said third fibrous material section comprising one or more third fibrous plies, each of the third fibrous plies comprising fibers that have a tenacity of at least 50% less than the tenacity of the fibers of the second fibrous material section;
  wherein the first fibrous material section, second fibrous material section and third fibrous material section are bonded together and form a consolidated, unitary composite article, wherein the article has an outermost, strike-face section, wherein said first fibrous material is positioned as said outermost, strike-face section.

13. The ballistic resistant composite of claim 12 wherein each fibrous material section has an areal density of at least 976 $g/m^2$.

14. The ballistic resistant composite of claim 8 wherein said nylon fibers have a tenacity of from about 5 g/denier to about 10 g/denier.

15. The ballistic resistant composite of claim 8 wherein said nylon fibers have a tenacity of less than 7 g/denier.

16. The ballistic resistant composite of claim 8 wherein said nylon fibers have a tenacity of less than 5 g/denier.

17. The ballistic resistant composite of claim 1 wherein each of the fibers of the first fibrous material has a tenacity of from about 28 $g/m^2$ to about 60 $g/m^2$, each of the fibers of the second fibrous material has a tenacity of from about 20 $g/m^2$ to about 30 $g/m^2$ and each of the fibers of the third fibrous material has a tenacity of from about 5 $g/m^2$ to about 20 $g/m^2$ or less than 5 $g/m^2$.

18. The ballistic resistant composite of claim 1 wherein each of the fibers of the first fibrous material has a tenacity of from about 28 $g/m^2$ to about 45 $g/m^2$, wherein each of the fibers of the second fibrous material has a tenacity of from about 20 $g/m^2$ to about 30 $g/m^2$ and wherein each of the fibers of the third fibrous material has a tenacity of less than 5 $g/m^2$.

19. The ballistic resistant composite of claim 1 which consists of three fibrous materials, wherein all the fibers of the first fibrous material and all the fibers of the second fibrous material are the same fiber type, and wherein the third fibrous material is formed from nylon fibers.

* * * * *